(No Model.)

P. SHEEHAN.
HORSE COLLAR.

No. 347,967. Patented Aug. 24, 1886.

WITNESSES:
John Robt Deemer
C. Sedgwick

INVENTOR:
P. Sheehan
BY Munn & Co
ATTORNEYS.

UNITED STATES PATENT OFFICE.

PATRICK SHEEHAN, OF MONROE, WISCONSIN.

HORSE-COLLAR.

SPECIFICATION forming part of Letters Patent No. 347,967, dated August 24, 1886.

Application filed May 27, 1886. Serial No. 203,428. (No model.)

*To all whom it may concern:*

Be it known that I, PATRICK SHEEHAN, of Monroe, in the county of Green and State of Wisconsin, have invented new and useful Improvements in Horse-Collars, of which the following is a specification, reference being had to the annexed drawings, forming a part thereof, in which—

Figure 1:
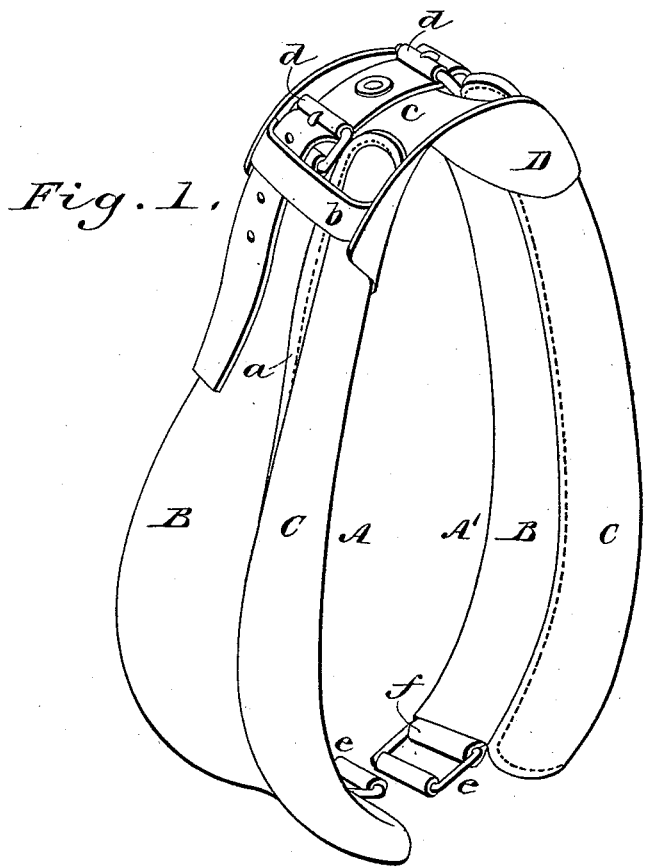
Figure 2:
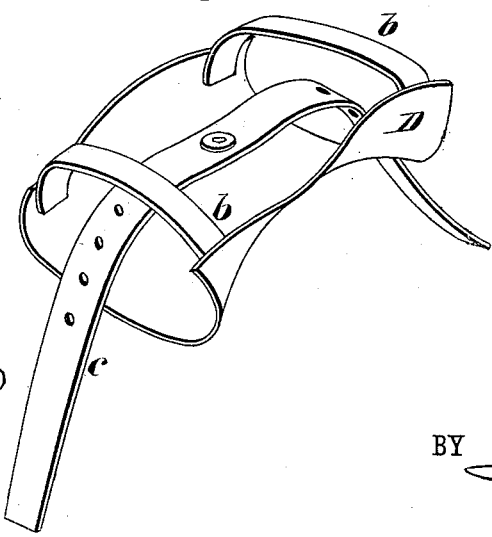

Figure 1 is a perspective view of my improved horse collar. Fig. 2 is a perspective view of the neck shield and strap.

Similar letters of reference indicate corresponding parts in both figures of the drawings.

My invention consists in the construction and arrangement of parts hereinafter fully described, and specifically pointed out in the claim.

The collar is formed of two similar parts, A A', having pads B, similar to those ordinarily employed in horse collars, and provided with rolls C, filled with rope or other suitable material, and forming, together with the pads, creases or grooves $a$, for receiving the hames connected with the harness.

The neck-shield D is placed under the upper ends of the collar, and provided with straps $b$, which reach around the ends of the collar, and with a longitudinal strap, $c$, riveted to the neck-shield at or near its center and received in buckles $d$, secured to the upper ends of the halves of the collar.

To the lower ends of the pads B are secured rectangular loops $e$ by means of leather straps $f$, extending upward into the pad, and fastened by stitching or otherwise. The hames, which fit into the creases $a$ of the opposite halves of the collar, are provided with straps, which extend through the loops $e$ and are buckled together. Arranged in this way the collar may be expanded or contracted to fit horses of different sizes.

It will be observed that the halves of the collar are disconnected at their lower ends, and that they are therefore free to move independently and in accordance with the motion of the horse's shoulders.

The ends of the collar will be prevented from spreading by the hames and hame-straps; but owing to the flexibility of these straps the halves of the collar will not be prevented from moving freely and independently.

The shield permits of adjusting the collar for different horses, and the great flexibility of the collar insures a perfect fit.

Having thus described my invention, what I claim as new, and desire to secure by Letters Patent, is—

A horse-collar comprising the two independent sections A A', having loops $e$ on their lower ends and buckles $d$ $d$ on their upper ends, and the separate and independent neck-shield D, having the keeper-straps $b$ $b$, to receive the upper ends of the collar sections, and the strap $c$, secured between its ends to the upper side of the shield and engaging the buckles $d$ $d$, substantially as set forth.

PATRICK SHEEHAN.

Witnesses:
GEO. W. CRANE,
J. H. STRAUME.